United States Patent
Choi (10) Patent No.: US 10,598,279 B2
(45) Date of Patent: Mar. 24, 2020

(54) MOTOR CONTROL STRATEGY FOR ELECTRIC SHIFT-BY-WIRE SYSTEM

(71) Applicant: HYUNDAI AUTRON CO., LTD., Seoul (KR)

(72) Inventor: Seungman Choi, Gunpo-si (KR)

(73) Assignee: HYUNDAI AUTRON CO., LTD., Seoul (KR)

( * ) Notice: Subject to any disclaimer, the term of this patent is extended or adjusted under 35 U.S.C. 154(b) by 0 days.

(21) Appl. No.: 16/179,167

(22) Filed: Nov. 2, 2018

(65) Prior Publication Data

US 2019/0178373 A1   Jun. 13, 2019

(30) Foreign Application Priority Data

Dec. 7, 2017   (KR) .......................... 10-2017-0167317

(51) Int. Cl.
| | | |
|---|---|---|
| *F16H 61/32* | (2006.01) | |
| *H02P 27/08* | (2006.01) | |
| *H02P 25/08* | (2016.01) | |
| *F16H 61/02* | (2006.01) | |
| *F16H 59/10* | (2006.01) | |

(52) U.S. Cl.
CPC ............. *F16H 61/32* (2013.01); *H02P 25/08* (2013.01); *H02P 27/085* (2013.01); *F16H 59/105* (2013.01); *F16H 61/0286* (2013.01); *F16H 2061/326* (2013.01); *F16H 2306/24* (2013.01)

(58) Field of Classification Search
CPC ... F16H 61/32; F16H 2061/326; H02P 27/085
See application file for complete search history.

(56) References Cited

U.S. PATENT DOCUMENTS

| | | | |
|---|---|---|---|
| 8,620,537 B2 | 12/2013 | Kashiwagi | |
| 2013/0110365 A1* | 5/2013 | Kimura | ................... F16H 61/12 701/65 |
| 2017/0104435 A1* | 4/2017 | Nagata | ................ H02P 29/0241 |
| 2017/0248229 A1* | 8/2017 | Nakayama | ................ H02P 8/06 |
| 2017/0307074 A1* | 10/2017 | Yamada | .................. F16H 61/12 |

FOREIGN PATENT DOCUMENTS

JP    H07-81448 A    3/1995

OTHER PUBLICATIONS

Korean Office Action dated Feb. 26, 2019 for Korean Patent Application No. 10-2017-0167317.

* cited by examiner

*Primary Examiner* — Edwin A Young (74) *Attorney, Agent, or Firm* — Morgan, Lewis & Bockius LLP

(57) ABSTRACT

Disclosed herein is a motor control strategy of an electric shift-by-wire (SBW) system and is a method of performing PWM waveform simulation control in order to solve an impact/noise occurrence problem in a motor control process. A method of controlling the electric motor of an electric SBW system includes determining whether a current stage and a target stage are identical, rotating the motor in the direction of the target stage when the current stage and the target stage are not identical, performing motor OFF control when the current stage and the target stage are identical, performing reverse driving duty control when a difference between the current position and target position of the motor is less than a first setting value, and stopping the motor when the difference between the current position and target position of the motor is less than a second setting value.

9 Claims, 9 Drawing Sheets

25% Duty output simulation

FIG. 9 (Prior Art)

MOTOR CONTROL STRATEGY FOR ELECTRIC SHIFT-BY-WIRE SYSTEM

CROSS REFERENCE TO RELATED APPLICATION

The present application claims the benefit of Korean Patent Application No. 10-2017-0167317 filed in the Korean Intellectual Property Office on Dec. 7, 2017, the entire contents of which are incorporated herein by reference.

BACKGROUND OF THE INVENTION

1. Technical Field

The present invention relates to a motor control strategy of an electric shift-by-wire (SBW) system and, more particularly, to a method of performing pulse width modulation (PWM) waveform simulation control in order to solve a problem in that an impact/noise occurs in a motor control process.

2. Description of the Related Art

A transmission is a core element in the driving of a vehicle that functions to transfer electric power, generated by an engine, to the wheels by increasing or decreasing rotatory power of the engine based on a driving condition of the vehicle.

The transmission is divided into a manual transmission and an automatic transmission depending on a gear shifting method. The automatic transmission is recently used in most of vehicles due to an advantage in that convenient and smooth driving is possible because a separate clutch manipulation is not necessary.

The automatic transmission is divided into an automatic transmission equipped with a mechanical SBW system for performing gear shifting using a mechanical link structure through a wire and an automatic transmission equipped with an electric SBW system for performing gear shifting using an electrical signal using a substrate instead of the mechanical link structure.

The electric SBW system has an advantage in that an impact and vibration are significantly reduced compared to a conventional mechanical SBW system because it can transfer information of a transmission stage selected by a driver as an electrical signal without a mechanical connection between the transmission and a shift lever unlike the mechanical SBW system despite a disadvantage of a high price. Vehicles recently adopting an electric SBW system owing to such an advantage are gradually increasing.

In the electric SBW system, a gear shifting part includes a detent plate chiefly rotatably driven by an electric motor, a manual valve positioned in the detent plate to operate in conjunction with the detent plate and to set a shift range of the automatic transmission as a shift range corresponding to the rotation position of the detent plate, and a detent spring inserted into a concave part formed in the detent plate to regulate the rotation of the detent plate, to restrict the shift range within a specific range, and to have supportable regulation means.

However, the electric SBW system does not completely prevent the occurrence of an impact and vibration because it rotatably drives an electric actuator, that is, an electric motor.

Figure 9:
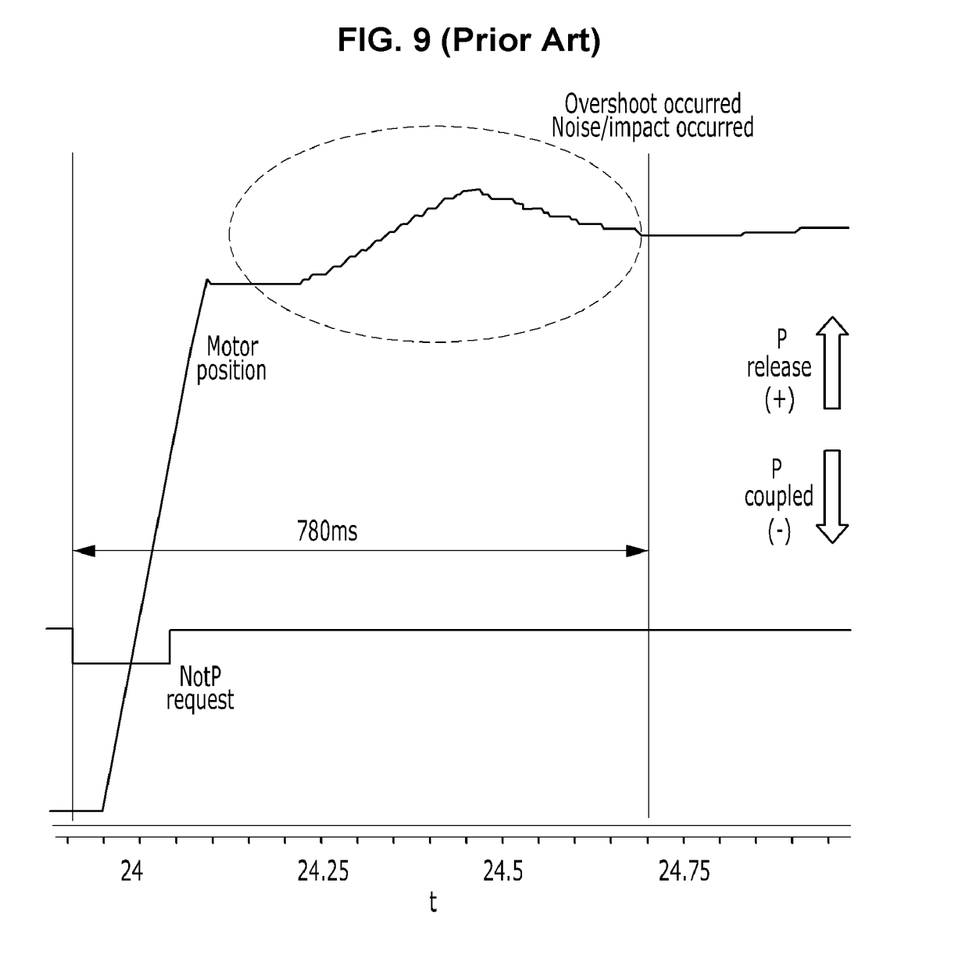
FIG. 9 is a diagram showing the state in which a motor position according to a conventional technology is controlled.

FIG. 9 is a diagram showing the state in which a motor position according to a conventional technology is controlled.

Referring to FIG. 9, the motor may be accelerated by a shape of the detent plate and elastic repulsive power of the detent spring. The accelerated motor generates an impact and noise in a process for the end of the detent spring to be engaged with the detent plate, and may deteriorate durability because the motor generates heat when it is used for a long period of time.

In a conventional electric SBW system, in order to reduce an impact and noise occurring in this process, for example, a control strategy is used in which when 90% of a target position (e.g., concave part) is reached, the motor is controlled to be held for a given time (e.g., 100 ms) and motor driving becomes OFF.

It is however difficult to satisfy the requirements of a low vibration characteristic and silence for a vehicle despite such efforts to reduce an impact and noise.

PRIOR ART DOCUMENT

Patent Document (Patent Document 0001) U.S. Pat. No. 8,620,537 "Shift-by-wire system"

SUMMARY OF THE INVENTION

A common switched reluctance (SR) motor chiefly performs ON/OFF control because PWM control used in a BLDC/DC motor is not easy.

The SR motor requires a given time taken for the motor to be magnetized because it uses a rotor made of STS without using a permanent magnet unlike the BLDC/DC motor. Accordingly, it is difficult to apply PWM control in which ON and OFF are repeated in a short cycle to control of the SR motor.

Various embodiments of the present invention are to reduce an impact and noise occurring when a motor is controlled by performing control to simulate a PWM waveform, which is difficult to apply to a conventional SR motor.

A method of controlling the electric motor of an electric shift-by-wire (SBW) system according to various embodiments of the present invention includes determining whether a current stage and a target stage are identical, rotating the motor in the direction of the target stage when the current stage and the target stage are not identical, performing motor OFF control when the current stage and the target stage are identical, performing reverse driving duty control when a difference between the current position and target position of the motor is less than a first setting value, and stopping the motor when the difference between the current position and target position of the motor is less than a second setting value.

In this case, the motor may be a switched reluctance (SR) motor.

The motor OFF control may be performed in each of the phases of the motor classified depending on shapes of the detent plate of the electric SBW system.

According to various embodiments of the present invention, in the reverse driving duty control, a duty and a period may be determined based on speed of the motor.

When the amount of motor speed is less than a third set value, first reverse driving duty control may be performed. When the amount of motor speed is less than a fourth set value, second reverse driving duty control may be performed.

In this case, the second reverse driving duty control and the first reverse driving duty control may be combined and performed.

A method of controlling an electric motor of an electric shift-by-wire (SBW) system including a switched reluctance (SR) motor may include performing motor OFF control in a motor ON state and performing reverse driving duty control based on a difference between a current position and target position of the motor and an amount of current motor speed in the motor OFF control.

According to an embodiment, the reverse driving duty control may include determining whether the reverse driving duty control is to be started or ended based on the difference between the current position and target position of the motor and determining a duty ratio of the reverse driving duty control in proportion to the amount of motor speed.

<Description of reference numerals>

| | |
|---|---|
| 100: shift lever | 110: shift lever sensor |
| 200: electric motor | |
| 210: electric motor position sensor | |
| 220: rotation shaft | 230: detent plate |
| 240: detent spring | 250: fixing part |
| 300: controller | |

DETAILED DESCRIPTION

The following embodiments are provided so that those skilled in the art may easily understand the technical spirit of the present invention and the present invention is not restricted by the embodiments. Furthermore, contents expressed in the accompanying drawings have been diagrammed to easily describe the embodiments of the present invention, and may be different from forms that are actually implemented.

Furthermore, when it is said that one element is "connected or coupled" to the other element, it should be understood that one element may be directly connected or coupled" to the other element, but a third element may exist between the two elements. Furthermore, in the entire specification, when it is described that one member is placed "on or over" the other member, it means that one member may adjoin the other member and a third member may be interposed between the two members.

Furthermore, in relation to the description of the drawings, similar reference numerals may be used for similar elements. An expression of the singular number may include an expression of the plural number unless clearly defined otherwise in the context. In this document, an expression, such as "a or b", "at least one of a and/or b", "a, b or c", or "at least one of a, b and/or c", may include all of possible combinations of listed items together. Expressions, such as a "first" and a "second", may modify corresponding elements regardless of the sequence or importance, and are used to only distinguish between one element and the other element and do not limit corresponding elements. Expressions, such as "A", "B" and "C", may modify corresponding elements regardless of the sequence or importance, and are used to only distinguish between one element and the other element and do not limit corresponding elements.

An expression of the singular number includes a plurality of expressions unless clearly defined otherwise in the context. It may be understood that a term, such as "include", "comprise" or "have", means the presence of a characteristic, number, step, operation, element or part described in the specification or a combination of them, and may be construed as including one or more other characteristics, numbers, steps, operations, elements or parts or combinations of them.

A term, such as a "system" used in this specification should be understood to mean a system including a plurality of elements.

Hereinafter, an electric shift-by-wire (SBW) system according to various embodiments of the present invention is described in detail with reference to the accompanying drawings. First, schematic elements of the electric SBW system according to various embodiments of the present invention may be described with reference to FIGS. 1 to 3.

Figure 1:
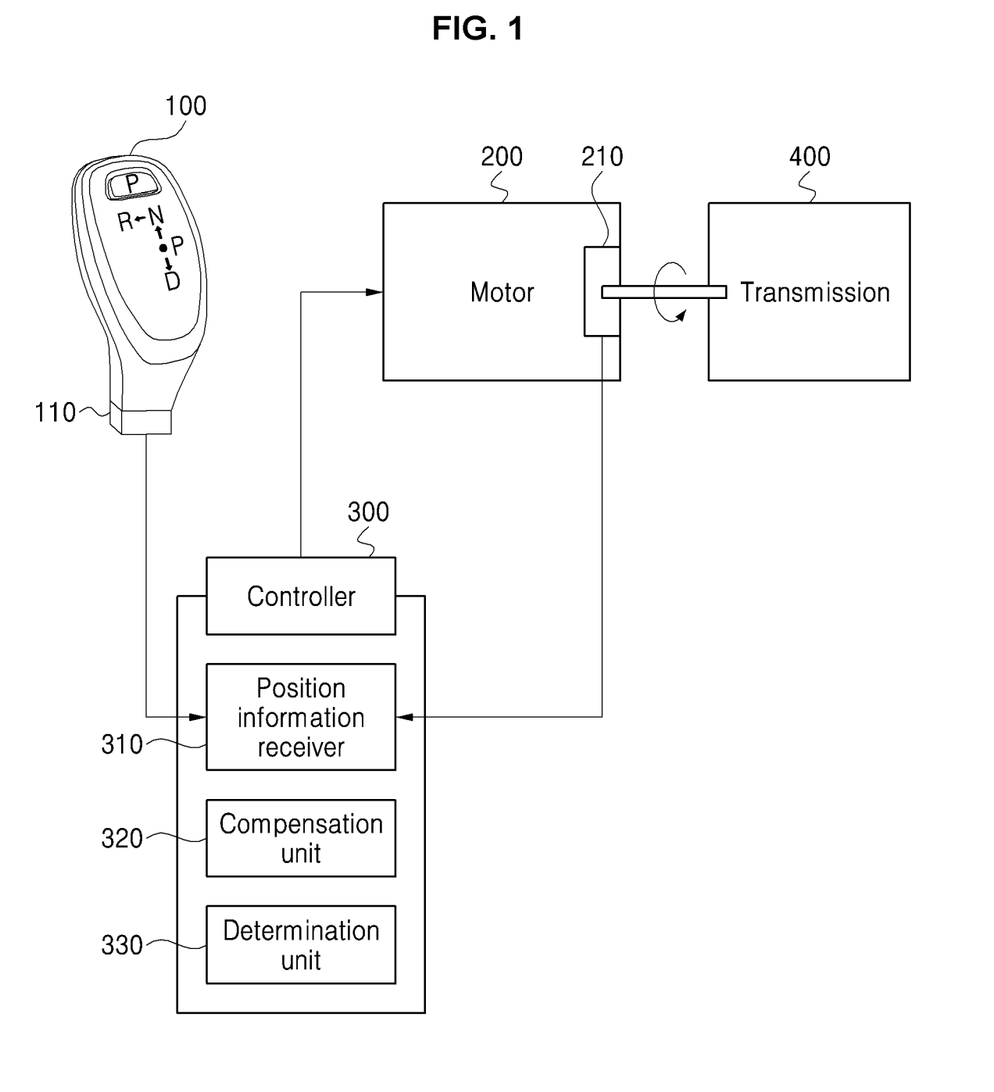
FIG. 1 is a diagram showing elements of the motor control system of an electric shift-by-wire (SBW) system according to various embodiments of the present invention.
Figure 2:
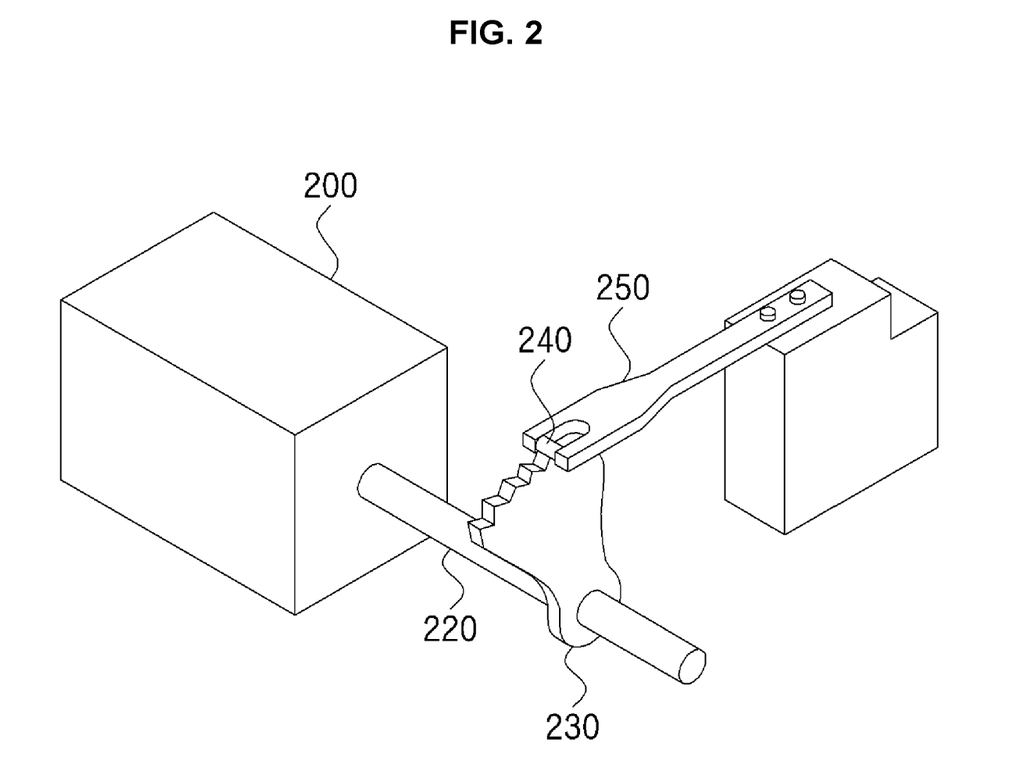
FIG. 2 is a perspective view showing the detent plate and detent spring of the electric SBW system according to various embodiments of the present invention.
Figure 3A:
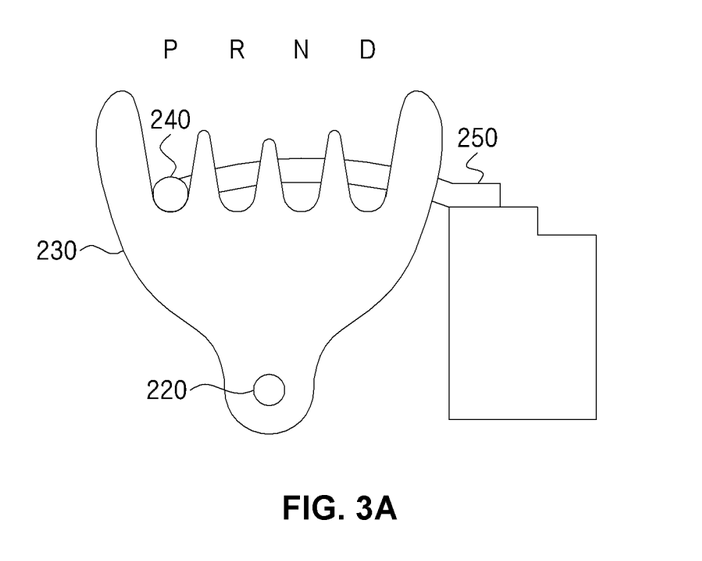
FIG. 3A is a diagram showing the state in which the detent spring has been positioned in a valley portion of the detent plate.
Figure 3B:
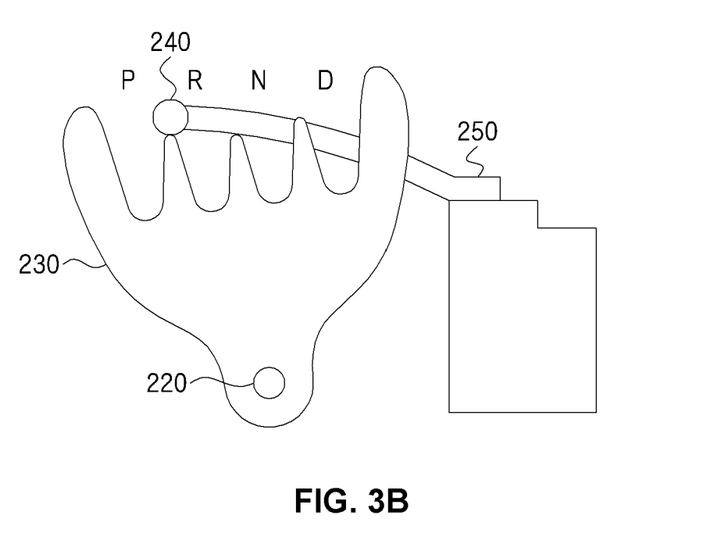
FIG. 3B is a diagram showing the state in which the detent spring has been positioned in a ridge portion of the detent plate in a gear shift process.

FIG. 1 is a diagram showing elements of the motor control system of an electric SBW system according to various embodiments of the present invention. FIG. 2 is a perspective view showing the detent plate and detent spring of the electric SBW system according to various embodiments of the present invention. FIG. 3A is a diagram showing the state in which the detent spring has been positioned in a valley portion of the detent plate. FIG. 3B is a diagram showing the state in which the detent spring has been positioned in a ridge portion of the detent plate in a gear shift process.

The electric SBW system according to an embodiment of the present invention may include a shift lever sensor 110 configured to identify a target gear shift stage by sensing a position of a shift lever 100 changed by a driver's manipulation, an electric motor position sensor 210 configured to identify a current gear shift stage by sensing the current position of an electric motor 200, and a controller 300 configured to receive information from the shift lever sensor 110 and the electric motor position sensor 210 and to adjust the rotation speed of the electric motor 200 based on the received information and previously stored information about the shape of a detent plate 230.

The shift lever sensor 110 may mean an element attached to the shift lever 100 and to sense a change in the position of the shift lever 100 according to a driver's manipulation. For example, when a driver changes a transmission stage from a "mode P" stage to a "mode D" stage by manipulating the shift lever 100, the shift lever sensor 110 may recognize the "mode D" stage as a target gear shift stage (hereinafter referred to a "target stage").

In various embodiments of the present invention, a P range that is a range for non-driving and parking, an R range that is a range for reverse driving, an N range that is a middle range, and a D range that is a driving range have been set in the automatic transmission as transmission stages. In this case, the P range may correspond to "mode P", the R range may correspond to "mode R", the N range may correspond to "mode N", and the D range may correspond to "mode D." They are only examples of transmission stages set for convenience of description, but the present invention is not essentially limited thereto.

For example, the D range may be subdivided into D-1, D-2 and D-3 depending on speed or acceleration of a vehicle.

Furthermore, in all of embodiments included in the specification of the present invention, the ranges and the areas of the detent plate 230 corresponding to the respective ranges are shown like P, R, N and D, but the present invention is not essentially limited thereto. In some embodiments, the ranges and the areas may be shown in a different sequence or another range may be additionally combined.

The detent plate 230 according to various embodiments of the present invention is included in a gear shifting part according to various embodiments of the present invention, and may mean an element engaged with a detent spring 240 to enable gear shifting according to a driver's intention.

The detent plate 230 may have a generally flat plate shape and is a generally fan shape when viewed from the front of an axis direction. The detent plate may have a structure in which a plurality of concave parts and a plurality of convex parts have been intersected. In this case, each of the concave parts may be an element corresponding to each of the aforementioned transmission stages. The convex part is positioned between the transmission stages, has an uneven shape and may form the boundary of the transmission stages.

The detent plate 230 may be integrated with a shaft. The detent plate 230, together with the shaft, may be rotatably driven by the motor. Rotatory driving power of the motor 200 in the gear shifting part may be changed into a straight-line movement using the detent plate 230 and the shaft according to an embodiment.

The detent spring 240 is an elastic, deformable and long member, and may include a detent roller, that is, movement regulation means, at the end thereof. The detent spring 240 may be configured to apply an elastic repulsive power to the detent roller in the center direction of the detent plate 230, that is, in the depressed direction of the concave part. When a force according to motor driving is applied to the detent plate 230, the detent roller passes through (climbs over) a convex part formed between concave part and then moves to another adjacent concave part. As a result, gear shifting may be performed.

The concave parts of the detent plate may correspond to the transmission stages P, R, N and D according to an embodiment of the present invention. The detent plate 230 includes ridge and valley shapes corresponding to the transmission stages P, R, N and D. When the end of the detent spring 240 coupled to a fixing part 250 is positioned at a valley of the detent plate 230 by the rotation of the detent plate 230, a corresponding transmission stage becomes a current gear shift stage. More specifically, the end of the detent spring 240, that is, the detent roller, is inserted into one of the plurality of concave parts to regulate the rotation of the detent plate 230, so the shift range of the automatic transmission is set and supported.

For reference, according to various embodiments of the present invention, when the shift range switches from the P side to the D side, the direction in which the detent plate 230 is rotated may be forward rotation. Inversely, when the shift range switches from the D side to the P side, the direction in which the detent plate 230 is rotated may be called reverse rotation.

The electric motor position sensor 210 according to various embodiments of the present invention may be attached to the electric motor 200 to identify the current position of the electric motor 200. The current position of the electric motor 200 may mean an angle by which the rotation shaft 220 of the electric motor 200 has been rotated at the present point.

The detent plate 230 is coupled to the rotation shaft 220 of the electric motor 200, so the detent plate 230 can be rotated by the rotation of the rotation shaft 220.

Information about the position of the detent plate 230 and the detent spring 240 corresponding to the current position of the electric motor 200 may be mapped to the controller 300. When the electric motor position sensor 210 identifies the current position of the electric motor, information about the current gear shift stage of a vehicle may also be identified.

In this case, the electric motor position sensor 210 may include at least any one of an encoder, an inhibitor switch and a hall sensor for magnetic detection, but is not limited thereto. The electric motor position sensor 210 may include any type of sensor capable of measuring the rotation angle of the electric motor 200.

The electric motor position sensor 210 may generate a pulse signal in response to a change in the rotation angle of the electric motor.

The controller 300 according to an embodiment of the present invention is described. The controller 300 according to an embodiment of the present invention may be one element of a central processing unit (CPU), a transmission control unit (TCU) and an engine control unit (ECU).

The electric SBW system according to various embodiments of the present invention may be subdivided into an automatic transmission controller (not shown), an SBW controller (not shown) and an engine controller (not shown). Each of the automatic transmission controller, SBW controller and engine controller may mean a small-sized computer, including a CPU that is operation means, ROM and RAM that are storage means, and input and output means.

The automatic transmission controller, SBW controller and engine controller may be integrated by the controller 300 according to an embodiment of the present invention. That is, the controller 300 may mean an integrated CPU. The controller 300 may be electrically connected to a battery (and/or an AC generator), that is, power for a vehicle, and may operate by electric power supplied by the battery.

The automatic transmission controller may drive the automatic transmission of a vehicle by fluid pressure. An automatic transmission control system may include a hydraulic circuit configured to change a shift range and transmission stage of the automatic transmission and an electronic valve configured to electrically control the hydraulic circuit.

The hydraulic circuit may include a manual valve. As the manual valve moves in the axis direction, the hydraulic circuit may be switched. When the manual valve switches the hydraulic circuit, the automatic transmission may be set as one of shift ranges.

The automatic transmission controller may receive a detection signal from a vehicle speed sensor for detecting speed of a vehicle, and may control each electronic valve.

The SBW controller includes an actuator, a transmission mechanism, etc. for driving the valve and brake of the automatic transmission control system. The actuator may include the electric motor 200 and the electric motor position sensor 210.

The SBW controller sequentially electrifies a plurality of coils configuring the electric motor at set timing, thereby rotating the rotor and the shaft configuring the electric motor.

As described above, the controller 300 according to an embodiment of the present invention may include the automatic transmission controller, SBW controller and engine controller, and may function to control the electric motor in response to the speed of a vehicle.

Furthermore, the controller 300 according to various embodiments of the present invention may include a position information receiver 310, a compensation unit 320 and a determination unit 330 in a functional aspect.

First, the position information receiver 310 may receive information about a target gear shift stage and a current gear shift stage from the shift lever sensor 110 and the electric motor position sensor 210, respectively.

Furthermore, the position information receiver 310 may identify whether the end of the detent spring 240 is positioned at a ridge or valley of the detent plate 230, whether the end of the detent spring 240 is positioned at which point while moving from a valley to a ridge, or whether the end of the detent spring 240 is positioned at which point while moving from a ridge to a valley by receiving information about the current position (rotation angle) of the electric motor 200.

The compensation unit 320 may control rotation speed of the electric motor 200 by performing feedforward control and proportional integral derivative (PID) control based on information received from the position information receiver 310. Specifically, the compensation unit 320 may perform feedforward control and PID control at the same time or at different times. Accordingly, the compensation unit 320 may calculate a target duty value for rotating the electric motor 200 at a desired speed by correcting the driving duty value of the electric motor 200.

The compensation unit 320 may perform feedforward control based on information about the positions of the detent plate 230 and detent spring 240 identified by the position information receiver 310. In this case, the information about the positions of the detent plate 230 and detent spring 240 may mean relative position information.

When the position of the detent spring 240 is changed from a valley to ridge of the detent plate 230 by the rotation of the detent plate 230, speed at which the detent plate 230 rotates may slow down because a restoring force is applied by the detent spring 240.

In this case, the compensation unit 320 according to various embodiments of the present invention may control the rotation speed of the electric motor 200 more rapidly by performing positive feedforward control.

Inversely, when the position of the end of the detent spring 240 is changed from a ridge to valley of the detent plate 230 by the rotation of the detent plate 230, speed at which the detent plate 230 rotates may become faster because the restoring force is inversely applied. An impact and noise may occur between the detent plate 230 and the detent spring 240 during the process.

To this end, the compensation unit 320 according to various embodiments of the present invention may control the rotation speed of the electric motor 200 more slowly by performing negative feedforward control.

That is, the compensation unit 320 may perform compensation control on the motor based on a position relation between the detent plate 230 and the end of the detent spring 240 by performing the feedforward control.

Finally, after control of the electric motor 200 is performed by the compensation unit 320, the determination unit 330 determines whether a current gear shift stage (or a current lever position) and a target gear shift stage (or a target lever position) are identical by comparing the current position of the electric motor with a target position.

If, as a result of the comparison, the current gear shift stage and the target gear shift stage are not identical, the determination unit 330 may change the control strategy of the electric motor 200. Furthermore, if, as a result of the comparison, the current gear shift stage and the target gear shift stage are identical, the determination unit 330 may stop motor control until a driver performs a new manipulation of the shift lever 100.

Figure 4:
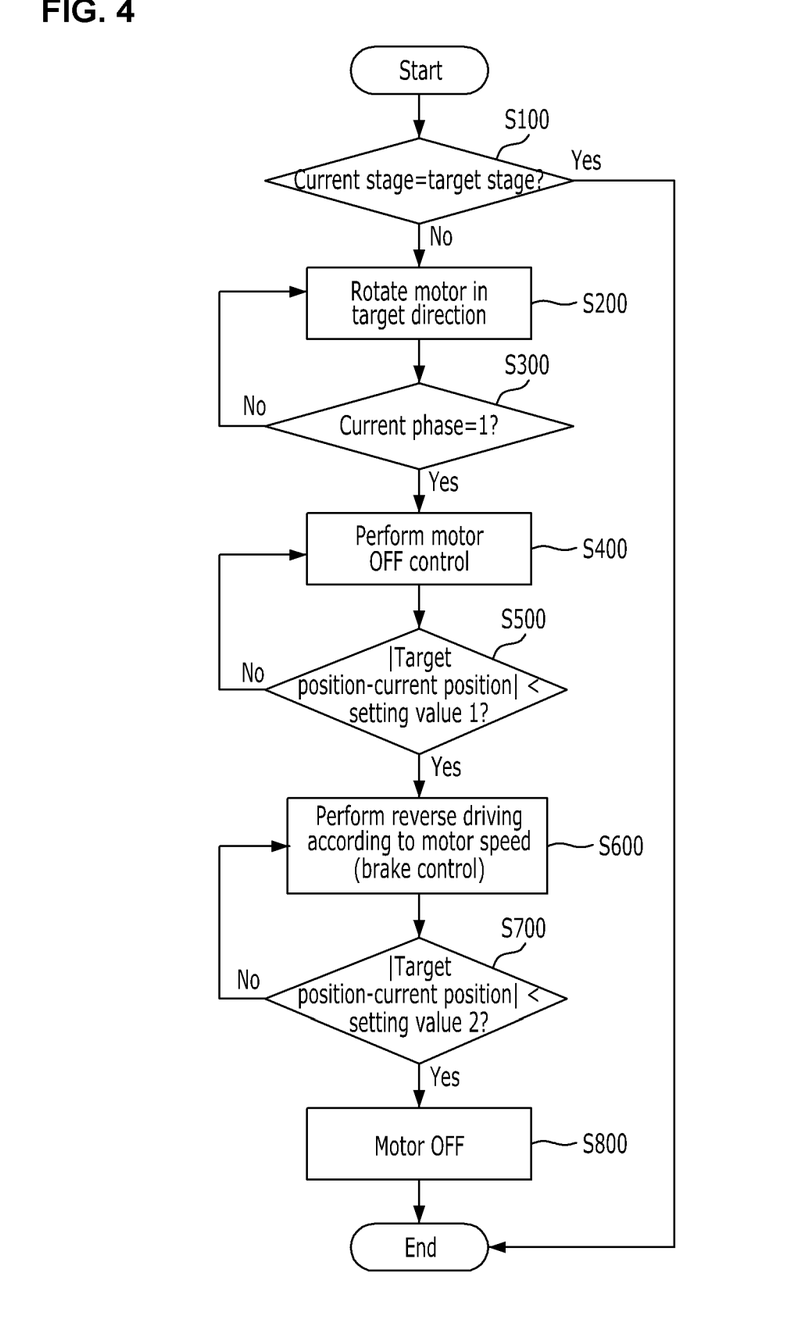
FIG. 4 is a block diagram showing a method of controlling the motor of the electric SBW system according to various embodiments of the present invention.
Figure 5:
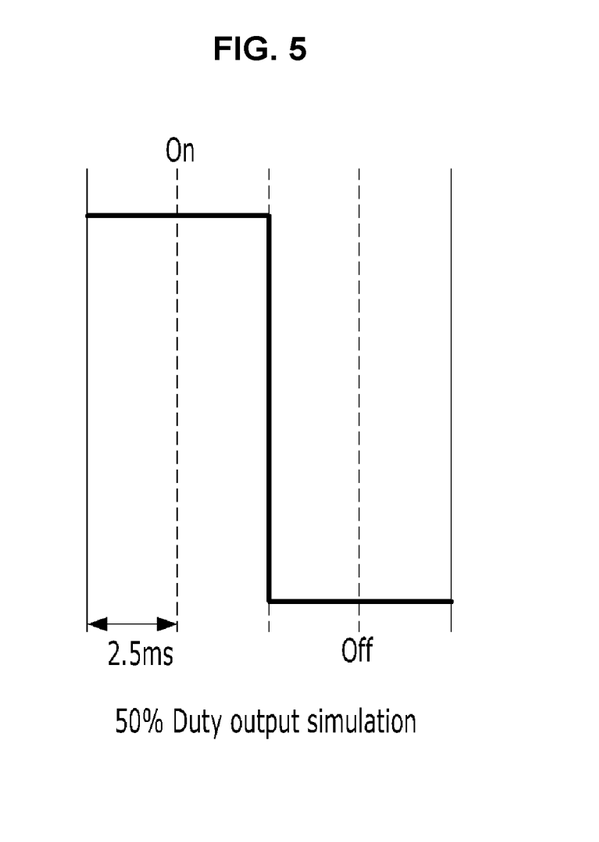
FIG. 5 is a diagram showing a duty output simulation method according to various embodiments of the present invention.
Figure 6:
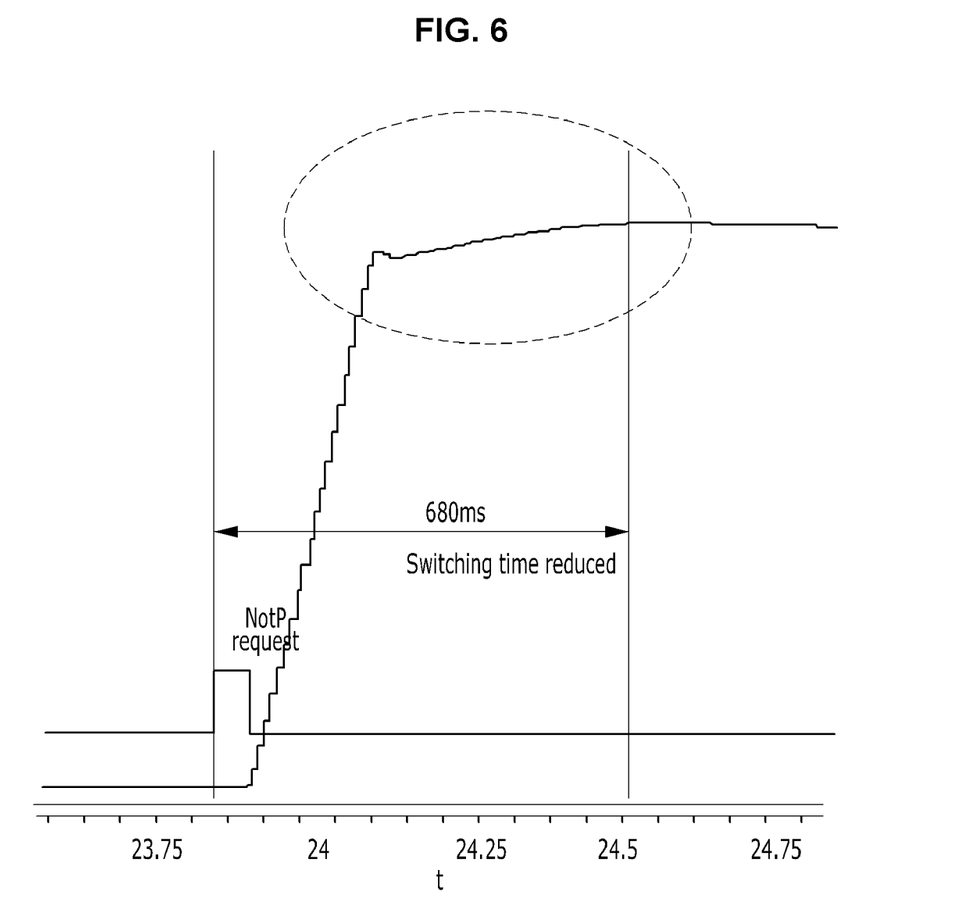
FIG. 6 is a diagram showing the state in which a motor position is controlled according to a duty output simulation method according to various embodiments of the present invention.
Figure 7:
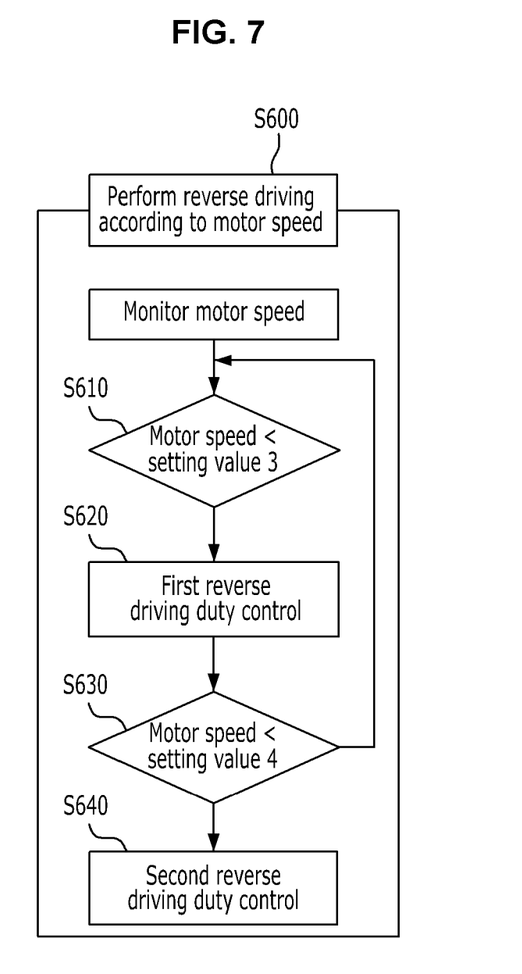
FIG. 7 is a diagram showing a reverse driving duty control method according to various embodiments of the present invention.
Figure 8:
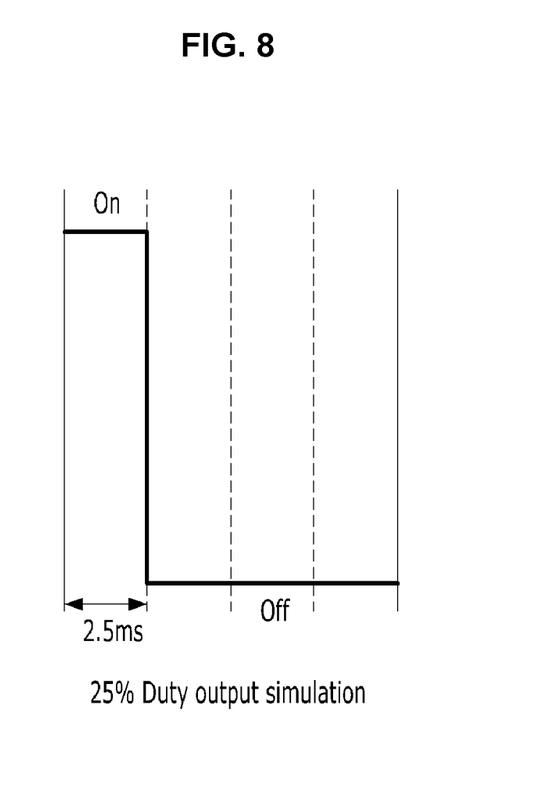
FIG. 8 is a diagram showing a duty output simulation method according to various embodiments of the present invention.

FIG. 4 is a block diagram showing a method of controlling the motor of the electric SBW system according to various embodiments of the present invention. FIG. 5 is a diagram showing a duty output simulation method according to various embodiments of the present invention. FIG. 6 is a diagram showing the state in which a motor position is controlled according to a duty output simulation method according to various embodiments of the present invention. FIG. 7 is a diagram showing a reverse driving duty control method according to various embodiments of the present invention. FIG. 8 is a diagram showing a duty output simulation method according to various embodiments of the present invention.

The electric motor according to various embodiments of the present invention may be a switched reluctance (SR) motor.

In general, the SR motor requires a given time taken for the motor to be magnetized because it uses a rotor made of STS (e.g., lump of iron). Accordingly, it is difficult to apply PWM control in which ON and OFF are repeated in a short cycle to control of the SR motor.

According to various embodiments of the present invention, PWM simulation control is performed on the SR motor to which the application of PWM is not easy. Accordingly, an impact and noise can be reduced upon motor OFF control, and a switching time can be significantly reduced upon OFF control.

Specifically, referring to FIG. 4, a method of controlling the electric motor of the electric SBW system according to various embodiments of the present invention is a method of controlling the electric motor of the electric SBW system. The method may include the step S100 of determining whether a current stage and a target stage are identical, the step S200~300 of rotating the motor in the direction of the target stage when the current stage and the target stage are not identical, the step S400 of performing motor OFF control when the current stage and the target stage are identical, the step S500~600 of performing reverse driving duty control when a difference between the current position and target position of the motor is less than a first setting value, and the step S700 of stopping the motor when a difference between the current position and target position of the motor is less than a second setting value.

The shift lever 100 manipulated by a driver may be is electrically connected to the controller 300 by the shift lever sensor 110.

Accordingly, when the driver manipulates the shift lever 100, the driver's intention is delivered as an electrical signal, thereby being capable of driving the electric motor of the present invention.

When the driver manipulates the shift lever 100, the controller 300 may calculate (compute) the driver's target lever position. In this case, the driver's target lever position may correspond to the target position of the motor.

A change in the physical position of the shift lever 100 is input to the controller 300 in the form of an electrical signal. The controller 300 may drive the electric motor 200 and change a relative position between the detent plate 230 and the end of the detent spring 240 using the electrical signal.

Whether a current stage and a target stage are identical is determined. If, as a result of the determination, the current stage and the target stage are identical, the shift lever is determined to be positioned according to a driver's intention, and motor control is not performed. However, if, as a result of the determination, the current stage and the target stage are not identical, motor ON control of rotating the motor in the direction of the target stage is performed.

When a target lever position is calculated by a lever manipulation of a driver, the controller 300 starts motor control. In this case, the motor control may be divided and performed depending on a shape of the detent plate.

In a method of controlling the electric motor according to various embodiments of the present invention, when the detent spring moves from a valley to ridge of the detent plate based on an uneven part of the detent plate connected to the motor by one rotation shaft, acceleration control may be performed. When the detent spring moves from a ridge to valley of the detent plate, deceleration control may be performed.

Specifically, when the target position of the motor is calculated, motor control may be started and acceleration or deceleration control may be performed depending on a shape of the detent plate 230. Specifically, when the end (i.e., roller) of the detent spring 240 moves from a valley to ridge of the detent plate 230, acceleration control may be performed on the motor. When the end of the detent spring 240 moves from a ridge to valley of the detent plate 230, deceleration control may be performed on the motor. In this case, the acceleration or deceleration control may be performed by the compensation unit 320.

In accordance with various embodiments, a difference between the current position and target position of the motor may correspond to a current position and target position at the end of the detent spring 240. Furthermore, a difference between the current position and target position of the motor may be converted into an absolute value. If the difference is converted into an absolute value, the different value is determined depending on whether it is included in a preset range.

After the motor is rotated according to a motor ON control process, whether a current stage and a target stage are identical is determined again. If, as a result of the determination, the current stage and the target stage are not identical, the motor ON control process continues to be performed. If, as a result of the determination, the current stage and the target stage are identical, the motor OFF control process may be performed.

In a motor OFF control process according to various embodiments of the present invention, reverse driving duty control may be performed in order to reduce an impact and noise.

The reverse driving duty control does not continuously reduce the rotation speed of the motor, but discretely reduces the rotation speed of the motor in the OFF control process.

The reverse driving duty control is performed when a difference between the current position and target position of the motor is less than a first setting value. In this case, the first setting value may be differently set depending on required precision according to embodiments. When the current position and target position of the motor is the first setting value or more, if the reverse driving duty control is started too early, it may be recognized that the sensitivity of the electric SBW system according to a driver's request for gear shifting is poor.

When a difference between the current position and target position of the motor is less than a second setting value, motor control may be terminated by stopping reverse driving duty control.

FIG. 5 is an example of a reverse driving duty and shows the results of simulations of a reverse driving duty control method having a duty of 50%.

For example, in a system using a 2.5 ms task, when the amount of motor speed is measured to be −1000 RPM, motor OFF control is performed by continuously outputting a duty of 50% for 10 ms. For reference, motor speed to determine a reverse driving duty may be based on an absolute value unit.

In accordance with a reverse driving duty control method having a duty of 50%, assuming that one period is 10 ms, two ON duties and two OFF duties may be output.

If motor control having such duties is performed, the results of motor position control, such as those shown in FIG. 6, may be obtained.

As a result, by performing the reverse driving duty control, the occurrence of an impact and noise (or occurrence of overshooting), such as FIG. 9, when OFF control is performed on a common SR motor can be suppressed.

In accordance with a method of controlling a motor according to various embodiments of the present invention, the motor OFF control may be performed in each of phases classified depending on shapes of the detent plate of the electric SBW system.

A region including the transmission stages P, R, N and D using the valleys and ridges of the detent plate 230 as boundaries may be divided into a plurality of phases. The method of controlling a motor according to an embodiment of the present invention may be performed on each of the plurality of phases.

FIG. 6 shows that motor OFF control according to an embodiment of the present invention is performed in one phase. Such a graph may be repeated until a target stage and a current stage are identical. For reference, a symbol "phase=1" shown in FIG. 4 may mean that the position of the motor (or the roller position of the detent spring) is positioned at the boundary of a corresponding phase, that is, a valley or a ridge.

In reverse driving duty control according to an embodiment of the present invention, a duty and a period may be determined based on speed of the motor. If the start and end of reverse driving duty control are determined based on a difference between the current position and target position of the motor, that is, a relative displacement according to the start and end points of the motor, the duty ratio (%) and duration of the reverse driving duty control may be based on speed of the motor.

For example, if the speed of the motor is not relatively great when reverse driving duty control is entered, a duty ratio may be set to have a relatively low duty ratio.

Referring to FIG. 7, a method of controlling an electric motor according to various embodiments of the present invention may include reverse driving duty control methods having different duties depending on a change in the speed of the motor.

According to an embodiment, when the amount of motor speed is less than a third set value, first reverse driving duty control may be performed. Furthermore, when the amount of motor speed is less than a fourth set value, second reverse driving duty control may be performed. In this case, the third set value may be set to −1000 RPM, for example. The fourth set value may be set to −500 RPM, for example. The amount of motor speed is 1 phase.

Specifically, when detected motor speed is measured to be −1000 RPM, first reverse driving duty control having a duty of 50% may be performed. If the motor speed has been reduced to −500 RPM by the first reverse driving duty control, second reverse driving duty control having a duty of 25% may be performed.

In accordance with a method of controlling a motor according to an embodiment, the second reverse driving duty control having the duty of 25% may mean that output having one ON duty and three OFF duties is performed, as shown in FIG. 8.

A method of controlling an electric motor according to various embodiments of the present invention may include combining and performing reverse driving duty control methods having different duties depending on a change in the speed of the motor. In this case, combining the reverse driving duty control methods may include performing two or more different reverse driving duty control methods in phases on time series and alternately performing two or more different reverse driving duty control methods.

According to various embodiments of the present invention, a method of controlling the electric motor of an electric SBW system including a switched reluctance (SR) motor may include the steps of performing motor OFF control in a motor ON state and performing reverse driving duty control based on a difference between the current position and target position of the motor and the amount of current motor speed in the motor OFF control step.

In this case, the reverse driving duty control may include determining whether the reverse driving duty control will be started or ended based on the difference between the current position and target position of the motor and determining a duty ratio of the reverse driving duty control in proportion to the amount of motor speed.

As describe above, if the method of controlling a motor according to various embodiments of the present invention is used, an impact and noise are reduced in the electric SBW system, thereby being capable of increasing a driver's satisfaction. As may be seen from FIGS. 6 and 9, the method has an advantage in that a switching time according to motor OFF control is significantly reduced.

If holding control has been performed on the motor in order to reduce an impact and noise and to prevent the occurrence of overshooting in a conventional electric SBW system, various embodiments of the present invention have an advantage in that a phenomenon in which heat is generated in the motor/controller can be reduced because high current control for holding is not used. Accordingly, if the phenomenon in which heat is generated in the motor/controller is reduced, there is an advantage in that driver convenience can be maximized because the switching of a lever position does not need to be limited.

If the method of controlling a motor according to various embodiments of the present invention is used, a driver's satisfaction can be improved because an impact and noise are reduced in the electric SBW system.

Furthermore, if the method of controlling a motor according to various embodiments of the present invention is used, there is an advantage in that a switching time according to motor OFF control is significantly reduced.

In accordance with the method of controlling a motor according to various embodiments of the present invention, high current control for holding is not used because holding control for reducing an impact and noise does not need to be performed on a motor in a conventional electric SBW system. Accordingly, there is an advantage in that a phenomenon in which heat is generated in the motor/controller is reduced. As a result, if the phenomenon in which heat is generated in the motor/controller can be reduced, there is an advantage in that driver convenience can be maximized because the switching of a lever position does not need to be limited.

It will be evident to those skilled in the art to which the present invention pertains that the method of controlling the electric motor of the electric SBW system according to various embodiments of the present invention is not restricted by the aforementioned embodiments and the accompanying drawings and may be substituted, modified and changed without departing from the technical spirit of the present invention.

What is claimed is:

1. A method of controlling an electric motor of an electric shift-by-wire (SBW) system, the method comprising:
   determining whether a current stage and a target stage are identical;
   rotating the motor in a direction of the target stage when the current stage and the target stage are not identical;
   performing motor OFF control when the current stage and the target stage are identical;
   performing reverse driving duty control when a difference between a current position and target position of the motor is less than a first setting value; and
   stopping the motor when the difference between the current position and target position of the motor is less than a second setting value.

2. The method of claim 1, wherein the motor comprises a switched reluctance (SR) motor.

3. The method of claim 1, wherein the motor OFF control is performed in each of phases of the motor classified depending on shapes of a detent plate of the electric SBW system.

4. The method of claim 1, wherein in the reverse driving duty control, a duty and a period are determined based on speed of the motor.

5. The method of claim 1, wherein when an amount of motor speed is less than a third set value, first reverse driving duty control is performed.

6. The method of claim 5, wherein when the amount of motor speed is less than a fourth set value, second reverse driving duty control is performed.

7. The method of claim 6, wherein the second reverse driving duty control and the first reverse driving duty control are combined and performed.

8. A method of controlling an electric motor of an electric shift-by-wire (SBW) system comprising a switched reluctance (SR) motor, the method comprising:
    performing motor OFF control in a motor ON state; and
    performing reverse driving duty control based on a difference between a current position and target position of the motor and an amount of current motor speed in the motor OFF control.

9. The method of claim 8, wherein the reverse driving duty control comprises:
    determining whether the reverse driving duty control is to be started or ended based on the difference between the current position and target position of the motor, and
    determining a duty ratio of the reverse driving duty control in proportion to the amount of motor speed.

* * * * *